United States Patent
Yaniv et al.

(10) Patent No.: US 8,422,197 B2
(45) Date of Patent: Apr. 16, 2013

(54) APPLYING OPTICAL ENERGY TO NANOPARTICLES TO PRODUCE A SPECIFIED NANOSTRUCTURE

(75) Inventors: Zvi Yaniv, Austin, TX (US); Nan Jiang, Austin, TX (US); James P. Novak, Austin, TX (US); Richard L. Fink, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 205 days.

(21) Appl. No.: 12/836,547

(22) Filed: Jul. 14, 2010

(65) Prior Publication Data

US 2011/0043965 A1 Feb. 24, 2011

Related U.S. Application Data

(60) Provisional application No. 61/225,797, filed on Jul. 15, 2009.

(51) Int. Cl.
*H01G 9/00* (2006.01)

(52) U.S. Cl.
USPC ........... 361/502; 361/503; 361/504; 361/512; 361/301.2; 361/301.4; 428/328; 428/332; 428/648; 428/652

(58) Field of Classification Search ......... 361/502, 361/503, 504, 509–512, 301.2, 301.4; 428/328, 428/332, 648, 652
See application file for complete search history.

(56) References Cited

U.S. PATENT DOCUMENTS

| | | | |
|---|---|---|---|
| 3,239,597 A | 3/1966 | Flynn | |
| 3,580,731 A | 5/1971 | Milewski et al. | |
| 3,796,598 A | 3/1974 | Gejyo et al. | |
| 3,950,605 A | 4/1976 | Hori et al. | |
| 4,093,466 A | 6/1978 | Davis | |
| 4,194,913 A | 3/1980 | Davis | |
| RE30,434 E | 11/1980 | Davis | |
| 4,234,631 A | 11/1980 | Davis | |
| 4,331,518 A | 5/1982 | Wilson | |
| 4,591,951 A | 5/1986 | Iwamoto et al. | |
| 4,640,746 A | 2/1987 | Nobel et al. | |
| 4,681,670 A | 7/1987 | Nobel et al. | |
| 4,749,626 A | 6/1988 | Kadija et al. | |
| 4,756,791 A | 7/1988 | D'Angelo et al. | |
| 4,922,322 A | 5/1990 | Mathew | |

(Continued)

FOREIGN PATENT DOCUMENTS

CN 1509206 A 6/2004
JP 62124084 6/1987

(Continued)

OTHER PUBLICATIONS

European Patent Office, Examination Report, Application No. 08 755 692.4, Apr. 13, 2012.

(Continued)

*Primary Examiner* — Nguyen T Ha
(74) *Attorney, Agent, or Firm* — Kelly Kordzik; Matheson Keys & Kordzak PLLC

(57) ABSTRACT

The instant article of manufacture is made by applying optical energy to one or more layers of nanoparticulate materials under predetermined conditions to produce a nanostructure. The nanostructure has layers of optically fused nanoparticles including a predetermined pore density, a predetermined pore size, or both. The predetermined conditions for applying the optical energy may include a predetermined voltage, a predetermined duration, a predetermined power density, or combinations thereof.

27 Claims, 12 Drawing Sheets

U.S. PATENT DOCUMENTS

| | | |
|---|---|---|
| 4,935,312 A | 6/1990 | Nakayama et al. |
| 4,959,278 A | 9/1990 | Shimauch et al. |
| 4,997,516 A | 3/1991 | Adler |
| 4,997,722 A | 3/1991 | Adler |
| 5,008,997 A | 4/1991 | Phy |
| 5,039,576 A | 8/1991 | Wilson |
| 5,049,718 A | 9/1991 | Spletter et al. |
| 5,130,275 A | 7/1992 | Dion |
| 5,160,422 A | 11/1992 | Nishimura et al. |
| 5,202,179 A | 4/1993 | Kasahara |
| 5,234,513 A | 8/1993 | Inoue et al. |
| 5,260,849 A | 11/1993 | Kasahara |
| 5,277,756 A | 1/1994 | Dion |
| 5,320,737 A | 6/1994 | Chao et al. |
| 5,322,823 A | 6/1994 | Ueda et al. |
| 5,384,204 A | 1/1995 | Yumoto et al. |
| 5,393,573 A | 2/1995 | MacKay |
| 5,439,639 A | 8/1995 | Vianco et al. |
| 5,492,595 A | 2/1996 | Carano et al. |
| 5,698,087 A | 12/1997 | Bokisa |
| 5,724,727 A | 3/1998 | Chopra et al. |
| 5,730,851 A | 3/1998 | Arrowsmith et al. |
| 5,750,017 A | 5/1998 | Zhang |
| 5,798,286 A | 8/1998 | Faraci et al. |
| 5,807,519 A | 9/1998 | Suzuki et al. |
| 5,861,076 A | 1/1999 | Adlam |
| 5,879,568 A | 3/1999 | Urasaki et al. |
| 5,889,083 A | 3/1999 | Zhu et al. |
| 5,990,197 A | 11/1999 | Escano et al. |
| 6,010,771 A | 1/2000 | Isen et al. |
| 6,093,503 A | 7/2000 | Isoyama et al. |
| 6,099,713 A | 8/2000 | Yanada et al. |
| 6,139,777 A | 10/2000 | Kazunori |
| 6,147,400 A | 11/2000 | Faraci et al. |
| 6,165,386 A | 12/2000 | Endo et al. |
| 6,200,732 B1 | 3/2001 | Tamura et al. |
| 6,238,847 B1 | 5/2001 | Axtell et al. |
| 6,248,455 B1 | 6/2001 | Adams et al. |
| 6,297,142 B1 | 10/2001 | Mita et al. |
| 6,306,947 B1 | 10/2001 | Morishima et al. |
| 6,361,823 B1 | 3/2002 | Bokisa et al. |
| 6,426,548 B1 | 7/2002 | Mita et al. |
| 6,433,409 B2 | 8/2002 | Mita et al. |
| 6,472,459 B2 | 10/2002 | Morales et al. |
| 6,530,944 B2 | 3/2003 | West et al. |
| 6,554,914 B1 | 4/2003 | Rozbicki et al. |
| 6,583,500 B1 | 6/2003 | Abbott et al. |
| 6,603,205 B2 | 8/2003 | Miura |
| 6,638,847 B1 | 10/2003 | Cheung et al. |
| 6,646,330 B2 | 11/2003 | Kubara et al. |
| 6,651,521 B2 | 11/2003 | Carbone et al. |
| 6,664,492 B1 | 12/2003 | Babb et al. |
| 6,679,937 B1 | 1/2004 | Kodas et al. |
| 6,682,584 B2 | 1/2004 | Pozarnsky et al. |
| 6,720,499 B2 | 4/2004 | Bokisa et al. |
| 6,773,827 B2 | 8/2004 | Higuchi |
| 6,773,828 B1 | 8/2004 | Ooi et al. |
| 6,774,036 B2 | 8/2004 | Goldstein |
| 6,783,569 B2 | 8/2004 | Cheon et al. |
| 6,828,660 B2 | 12/2004 | Abbott |
| 6,860,981 B2 | 3/2005 | Schetty, III et al. |
| 6,899,775 B2 | 5/2005 | Hill et al. |
| 6,917,098 B1 | 7/2005 | Yamunan |
| 6,951,666 B2 | 10/2005 | Kodas et al. |
| 7,019,391 B2 | 3/2006 | Tran |
| 7,062,848 B2 | 6/2006 | Pan et al. |
| 7,084,067 B2 | 8/2006 | Geusic et al. |
| 7,087,523 B2 | 8/2006 | Grigoropoulos et al. |
| 7,153,775 B2 | 12/2006 | Geusic |
| 7,160,629 B2 | 1/2007 | Crosby |
| 7,179,362 B2 | 2/2007 | Dietterle et al. |
| 7,195,702 B2 | 3/2007 | Bokisa, Sr. et al. |
| 7,215,014 B2 | 5/2007 | Su et al. |
| 7,252,699 B2 | 8/2007 | Perry et al. |
| 7,262,603 B1 | 8/2007 | Benton et al. |
| 7,294,366 B2 | 11/2007 | Renn et al. |
| 7,297,902 B2 | 11/2007 | Weiss |
| 7,316,725 B2 | 1/2008 | Kodas et al. |
| 7,357,681 B2 | 4/2008 | Yamagami et al. |
| 7,391,116 B2 | 6/2008 | Chen et al. |
| 7,482,540 B2 | 1/2009 | Shukushima et al. |
| 7,507,618 B2 | 3/2009 | Dunbar |
| 7,547,479 B2 | 6/2009 | Wessling |
| 7,776,196 B2 | 8/2010 | Fujimoto et al. |
| 7,786,024 B2 | 8/2010 | Stumbo et al. |
| 7,867,413 B2 | 1/2011 | Lee et al. |
| 7,879,131 B2 | 2/2011 | Yaniv et al. |
| 2002/0148386 A1 | 10/2002 | Woosman et al. |
| 2002/0158342 A1 | 10/2002 | Tuominen et al. |
| 2002/0185716 A1 | 12/2002 | Abys et al. |
| 2002/0187364 A1 | 12/2002 | Heber et al. |
| 2002/0192492 A1 | 12/2002 | Abys |
| 2003/0025182 A1 | 2/2003 | Abys et al. |
| 2003/0151030 A1 | 8/2003 | Gurin |
| 2003/0168639 A1 | 9/2003 | Cheon et al. |
| 2003/0226758 A1 | 12/2003 | Egli |
| 2004/0026256 A1 | 2/2004 | Lindgren |
| 2004/0026684 A1 | 2/2004 | Empedocies |
| 2004/0118696 A1 | 6/2004 | Zhang et al. |
| 2004/0131934 A1 | 7/2004 | Sugnaux et al. |
| 2004/0132299 A1 | 7/2004 | Matsuda et al. |
| 2004/0134379 A1 | 7/2004 | Wong et al. |
| 2004/0147618 A1 | 7/2004 | Lee et al. |
| 2004/0175631 A1 | 9/2004 | Crocker et al. |
| 2004/0192042 A1 | 9/2004 | Sirringhaus et al. |
| 2004/0232000 A1 | 11/2004 | Crosby |
| 2004/0241532 A1 | 12/2004 | Kim |
| 2004/0256239 A1 | 12/2004 | Whitlaw et al. |
| 2005/0019543 A1 | 1/2005 | Lyles |
| 2005/0078158 A1 | 4/2005 | Magdassi et al. |
| 2005/0097987 A1 | 5/2005 | Kodas et al. |
| 2005/0145502 A1 | 7/2005 | Schetty, III et al. |
| 2005/0148164 A1 | 7/2005 | Casey et al. |
| 2005/0183768 A1 | 8/2005 | Roscheisen et al. |
| 2005/0218398 A1 | 10/2005 | Tran |
| 2005/0230042 A1 | 10/2005 | Hasimoto |
| 2005/0249967 A1 | 11/2005 | Egli |
| 2005/0249968 A1 | 11/2005 | Xu et al. |
| 2005/0249969 A1 | 11/2005 | Xu et al. |
| 2005/0274480 A1 | 12/2005 | Barsoum et al. |
| 2006/0011267 A1 | 1/2006 | Kay et al. |
| 2006/0054668 A1 | 3/2006 | Severin |
| 2006/0057502 A1 | 3/2006 | Okada et al. |
| 2006/0062701 A1 | 3/2006 | Nakamura et al. |
| 2006/0068218 A1 | 3/2006 | Hooghan |
| 2006/0073680 A1 | 4/2006 | Han et al. |
| 2006/0082952 A1 | 4/2006 | Toshiaki |
| 2006/0090819 A1 | 5/2006 | Egli |
| 2006/0091121 A1 | 5/2006 | Zanolli et al. |
| 2006/0096867 A1 | 5/2006 | Bokisa et al. |
| 2006/0110424 A1 | 5/2006 | Lyles |
| 2006/0111467 A1 | 5/2006 | Reinhardt et al. |
| 2006/0141268 A1 | 6/2006 | Kalkan et al. |
| 2006/0159838 A1 | 7/2006 | Kowalski et al. |
| 2006/0163744 A1 | 7/2006 | Vanheusden et al. |
| 2006/0183055 A1 | 8/2006 | O'Neill et al. |
| 2006/0189113 A1 | 8/2006 | Vanheusden et al. |
| 2006/0234519 A1 | 10/2006 | Pan et al. |
| 2006/0240591 A1 | 10/2006 | Grier et al. |
| 2006/0286301 A1 | 12/2006 | Murata et al. |
| 2007/0007144 A1 | 1/2007 | Schetty, III |
| 2007/0040191 A1 | 2/2007 | Bezryadin et al. |
| 2007/0051927 A1 | 3/2007 | Itoh et al. |
| 2007/0074316 A1 | 3/2007 | Alden et al. |
| 2007/0095879 A1 | 5/2007 | Holmes |
| 2007/0105395 A1 | 5/2007 | Kinzel et al. |
| 2007/0117475 A1 | 5/2007 | Tu |
| 2007/0144305 A1 | 6/2007 | Jablonski et al. |
| 2007/0145375 A1 | 6/2007 | Cho |
| 2007/0148972 A1 | 6/2007 | Hara et al. |
| 2007/0158204 A1 | 7/2007 | Taylor et al. |
| 2007/0163643 A1 | 7/2007 | Van Duren |
| 2007/0166453 A1 | 7/2007 | Van Duren et al. |
| 2007/0175296 A1 | 8/2007 | Subramanian et al. |
| 2007/0176991 A1 | 8/2007 | Arai et al. |
| 2007/0190326 A1 | 8/2007 | Perry et al. |
| 2007/0218312 A1 | 9/2007 | Sakuyama et al. |

| | | | |
|---|---|---|---|
| 2007/0275262 | A1 | 11/2007 | Lin et al. |
| 2007/0281136 | A1 | 12/2007 | Hampden-Smith et al. |
| 2007/0281249 | A1 | 12/2007 | Tutt et al. |
| 2007/0284700 | A1 | 12/2007 | Jackson et al. |
| 2007/0287022 | A1 | 12/2007 | Jackson et al. |
| 2007/0287023 | A1 | 12/2007 | Jackson et al. |
| 2007/0287024 | A1 | 12/2007 | Jackson et al. |
| 2007/0289483 | A1 | 12/2007 | Cho et al. |
| 2007/0295530 | A1 | 12/2007 | Jackson et al. |
| 2008/0020304 | A1 | 1/2008 | Schroder et al. |
| 2008/0083950 | A1 | 4/2008 | Pan et al. |
| 2008/0143906 | A1 | 6/2008 | Allemand et al. |
| 2008/0169122 | A1 | 7/2008 | Shiraishi et al. |
| 2008/0193667 | A1 | 8/2008 | Garbar et al. |
| 2008/0286488 | A1 | 11/2008 | Li et al. |
| 2008/0305268 | A1 | 12/2008 | Norman et al. |
| 2009/0142481 | A1 | 6/2009 | Chopra et al. |
| 2009/0286383 | A1 | 11/2009 | Jiang et al. |
| 2010/0000762 | A1 | 1/2010 | Yang et al. |
| 2010/0035375 | A1 | 2/2010 | Grigoropoulos et al. |
| 2011/0043965 | A1 | 2/2011 | Yaniv et al. |

FOREIGN PATENT DOCUMENTS

| | | |
|---|---|---|
| JP | 10-308119 | 11/1998 |
| JP | 11-319538 | 11/1999 |
| JP | 2001-325831 | 11/2001 |
| JP | 2008006513 | 1/2008 |
| WO | 03106573 A1 | 12/2003 |
| WO | 2004005413 A1 | 1/2004 |
| WO | 2006072959 | 7/2006 |

OTHER PUBLICATIONS

Champion et al., "Sintering of copper nanopowders under hydrogen: an in situ X-ray diffraction analysis", Materials Science and Engineering A, vol. 360, No. 1-2, Nov. 1, 2003, pp. 258-263.

The State Intellectual Property Office of the People's Republic of China, Notice on Grant of Patent Right For Invention, Application No. 200880021733.6, Apr. 20, 2012.

The State Intellectual Property Office of the People's Republic of China, Notice on the First Office Action, Application No. 200980125925.6, Mar. 31, 2012, 8 pages, CN.

Korean Intellectual Property Office, Chemistry & Biotechnology Examination Bureau, Notice to File a Response, Patent Application No. 10-2010-7022240, May 8, 2012, KR.

Schroder et al., "Broadcast Photonic Curing of Metallic Nanoparticle Films," Nanotechnologies, Inc. publication, 2006 NSTI Nanotechnology Conference and Trade Show, May 7-11, 2006, 4 pages.

Lu et al., "Ultrahigh Strength and High Electrical Conductivity in Copper," Science Magazine, Apr. 2004, vol. 304, 6 pages.

Volkman et al., "Ink-jetted Silver/Copper Conductors for printed RFID Applications," Materials Research Society Magazine, 2004, vol. 814, 6 pages.

Wu et al., "One-Step Green Route to Narrowly Dispersed Copper Nanocrystals," Journal Of Nanoparticle Research, 2006, pp. 965-969, 5 pages.

Curtis et al., "Spray and inkjet Printing of Hybrid Nanoparticle-Metal-Organic Inks for Ag and Chu Metallizations," Materials Research Society Magazine, 2001, vol. 676, 6 pages.

Shacham-Diamond, "Electroless Copper Deposition Using Glyoxylic Acid as Reducing Agent for Ultralarge Scale Integration Metallization," manuscript published by Electrochemical And Solid-State Letters, Apr. 2000, pp. 279-282, 4 pages.

Yeshchenko et al., "Size-Dependent Melting of Spherical Copper Nanoparticles," article published by National Turas Shevchenko Kyiv University, Jan. 2007, 16 pages.

Virang G. Shah, "Trimming and Printing of Embedded Resistors Using Demand-Mode Ink-Jet Technology and Conductive Polymer," IPC Printed Circuit Expo Mar. 24-28, 2002, pp. 1-5.

International Search Report for PCT/US08/63890, Aug. 6, 2008, 9 pages.

International Search Report and Written Opinion for Application No. PCT/US/09/35717, May 5, 2009, 7 pages.

Niizeki et al., "Laser Sintering of Ag Nanopaste Film and Its Application to Bond-Pad Formation," 2008 Electronic Components and Technology Conference, May 27-30, 2008, IEEE, pp. 1745-1750.

Lee et al., "Spontaneous Growth Mechanism of Tin Whiskers," Acta mater. vol. 46, No. 10, pp. 3701-3714, 1998.

Gaylon, "Annotated Tin Whisker Bibliography and Anthology," IEEE Transactions on Electronics Packaging Manufacturing, vol. 28, No. 1, Jan. 2005, pp. 94-122.

Lal et al., "Role of Intrinsic Stresses in the Phenomena of Tin Whiskers in Electrical Connectors," IEEE Transactions on Electronics Packing Manufacturing, vol. 28, No. 1, Jan. 2005, pp. 63-74.

Boettinger et al., "Whisker and Hillock Formation on Sn, Sn-Cu and Sn-Pb Electrodeposits," Acta Materialia, 53, Sep. 8, 2005, pp. 5033-5050.

Mitooka et al., "Effect of Laser Irradiation on Generation and Growth of Whiskers in Tin-Electroplated Film," J. Japan Inst. Metals, vol. 73, No. 3, (2009), pp. 226-233.

Osenbach et al., "Sn Corrosion and Its Influence on Whisker Growth," IEEE Transactions on Electronic Packaging Manufacturing, vol. 30, No. 1, Jan. 2007, pp. 23-35.

Osenbach et al., "Sn Whiskers: Material, Design, Processing, and Post-Plate Reflow Effects and Development of an Overall Phenomenological Theory," IEEE Transactions on Electronics Packaging Manufacturing, vol. 28, No. 1, Jan. 2005, pp. 36-62.

Osterman, "Mitigation Strategies for Tin Whiskers," Release 1.0, Aug. 28, 2002, 11 pages.

Schroeder et al., "Tin Whisker Test Method Development," IEEE Transactions Electronics Packaging Manufacturing, vol. 29, No. 4, Oct. 2006, pp. 231-238.

International Search Report and Written Opinion for International Application No. PCT/US09/44196, Jun. 30, 2009, 8 pages.

International Search Report and Written Opinion for International Application No. PCT/US09/44195, Jun. 25, 2009, 7 pages.

International Preliminary Report on Patentability, International Application No. PCT/US2009/044196, Nov. 25, 2010, 6 pages.

International Preliminary Report on Patentability, International Application No. PCT/US2009/044195, Nov. 25, 2010, 5 pages.

International Search Report and Written Opinion for International Application No. PCT/US09/49510, Oct. 19, 2009.

International Preliminary Report on Patentability, PCT/US2008/063890, Dec. 3, 2009.

International Search Report and Written Opinion of the International Searching Authority for PCT/US10/28799, May 19, 2010.

International Search Report and the Written Opinion of the International Searching Authority for PCT/US10/28811, May 18, 2010.

MSDS: Fluorad by 3M, Fluorosurfactant FC-4430, Mar. 2, 2002; www.3m.com/paintsandcoatings, 4 pages.

Supplemental European Search Report; Application No. EP 09774505, Jun. 29, 2011.

Notice of the First Office Action, Application No. 200880021733.6, Jun. 22, 2011.

Supplementary European Search Report, Application No. EP08755692, Aug. 6, 2010.

Kogelschatz, "Excimer Lamps: History, Discharge Physics, and Industrial Applications", Proc. SPIE, vol. 5483, 2004, pp. 272-286.

International Preliminary Report on Patentability, PCT/US2010/042169, Jan. 17, 2012.

Notice on the First Office Action; Chinese Patent Application No. 200980108344.1, Jan. 21, 2012.

Kim et al., "Cyclic Properties of Si-Cu/carbon Nanocomposite Anodes for Li-Ion Secondary Batteries" Journal of the Electrochemical Society, vol. 152, No. 3, p. A-523-A526, published on Jan. 24, 2005, retrieved from the internet on Aug. 26, 2010.

PCT International Search Report for Application No. PCT/US 10/42169, mailed on Sep. 7, 2010, 4 pgs.

Written Opinion for Application No. PCT/US 10/42169, mailed on Sep. 7, 2010, 4 pgs.

Yaniv, Z., "Novel Inkettable Copper Ink Utilizing Processing Temperatures under 100 Degrees C without the Need of Inert Atmosphere" Presentation at Printed Electronics Europe Conference, p. 1-25, Apr. 7-8, 2009, retrieved from the internet on Aug. 26, 2010.

TEGO 425 Datasheet; http://evonik.tego.de/pdf/daten/amer/Flow_425.pdf.

United States Patent & Trademark Office, Final Office Action Summary, U.S. Appl. No. 12/391,817, dated Aug. 27, 2012.

United States Patent & Trademark Office, Non-Final Office Action Summary, U.S. Appl. No. 12/496,453, dated Jun. 13, 2012.

European Patent Office, Examination Report, Application No. 09774505.3, dated Sep. 26, 2012.

APPLYING OPTICAL ENERGY TO NANOPARTICLES TO PRODUCE A SPECIFIED NANOSTRUCTURE

PRIORITY CLAIM AND CROSS-REFERENCE TO RELATED APPLICATION

This application claims the benefit under 35 U.S.C. §119 (e)(1) of U.S. Provisional Application No. 61/225,797, filed Jul. 15, 2009, which is hereby incorporated by reference.

GOVERNMENT LICENSE RIGHTS

The U.S. Government has a paid-up license in this invention and the right in limited circumstances to require the patent owner to license others on reasonable terms as provided for by the terms of Contract No. W911-QX-10-C-0044 awarded by The Department of Defense.

BACKGROUND

This application is directed to applying optical energy to nanoparticles to produce a specified nanostructure.

SUMMARY

The instant article of manufacture may be made by a method including applying optical energy to one or more layers of unfused nanoparticulate materials under predetermined conditions to produce a nanostructure having certain properties and characteristics. For example, the nanostructure may include layers having a predetermined pore density, a predetermined pore size, or both. The predetermined conditions used to apply the optical energy may include a predetermined voltage, a predetermined duration, a predetermined power density, or combinations thereof.

The one or more layers of unfused nanoparticulate materials may include at least one layer of nanoparticulate Cu disposed on a polyamide substrate. At least a portion of the Cu nanoparticles of the at least one layer of nanoparticulate Cu may be optically fused together to form a continuous film over the substrate. The at least one layer of nanoparticulate Cu may be applied to the substrate as an ink formulation and disposed on the substrate via a printing process, such as a drop down printing process or a screen printing process.

The one or more layers of unfused nanoparticulate material may also include at least one layer of nanoparticulate Si disposed on one or more layers of nanoparticulate Cu. At least a portion of the Si nanoparticles of the at least one layer of nanoparticulate Si may be optically fused together, such that the at least one layer of nanoparticulate Si has a predetermined pore density, a predetermined pore size, or both. The at least one nanoparticulate Si layer may be applied to the one or more layers of nanoparticulate Cu as an ink formulation and disposed on the one or more layers of nanoparticulate Cu via a printing process.

Further, the one or more layers of unfused nanoparticulate material may include at least one layer of nanoparticulate Cu including nanoparticulate MnO additives disposed therein. A Cu oxide layer may be formed from the at least one layer of nanoparticulate Cu including the nanoparticulate MnO additives.

The properties and characteristics of the nanostructure may be predetermined based on a particular application for the nanostructure. For example, the nanostructure may be used to form a Si anode of a Li ion battery. Thus, the optical energy is applied to a number of layers of unfused nanoparticulate material in such a way to produce a nanostructure with characteristics optimized to function as a Si anode of a Li ion battery.

In another implementation, the nanostructure may be used to form a supercapacitor. Accordingly, the optical energy is applied to a number of layers of unfused nanoparticulate material to produce a nanostructure having characteristics and properties designed to function as a supercapacitor.

DESCRIPTION OF DRAWINGS OF EXEMPLARY EMBODIMENTS

The detailed description is described with reference to the accompanying figures. In the figures, the left-most digit(s) of a reference number identifies the figure in which the reference number first appears. The same numbers are used throughout the drawings to reference like features and elements.

DETAILED DESCRIPTION OF EXEMPLARY EMBODIMENTS

Figure 1:
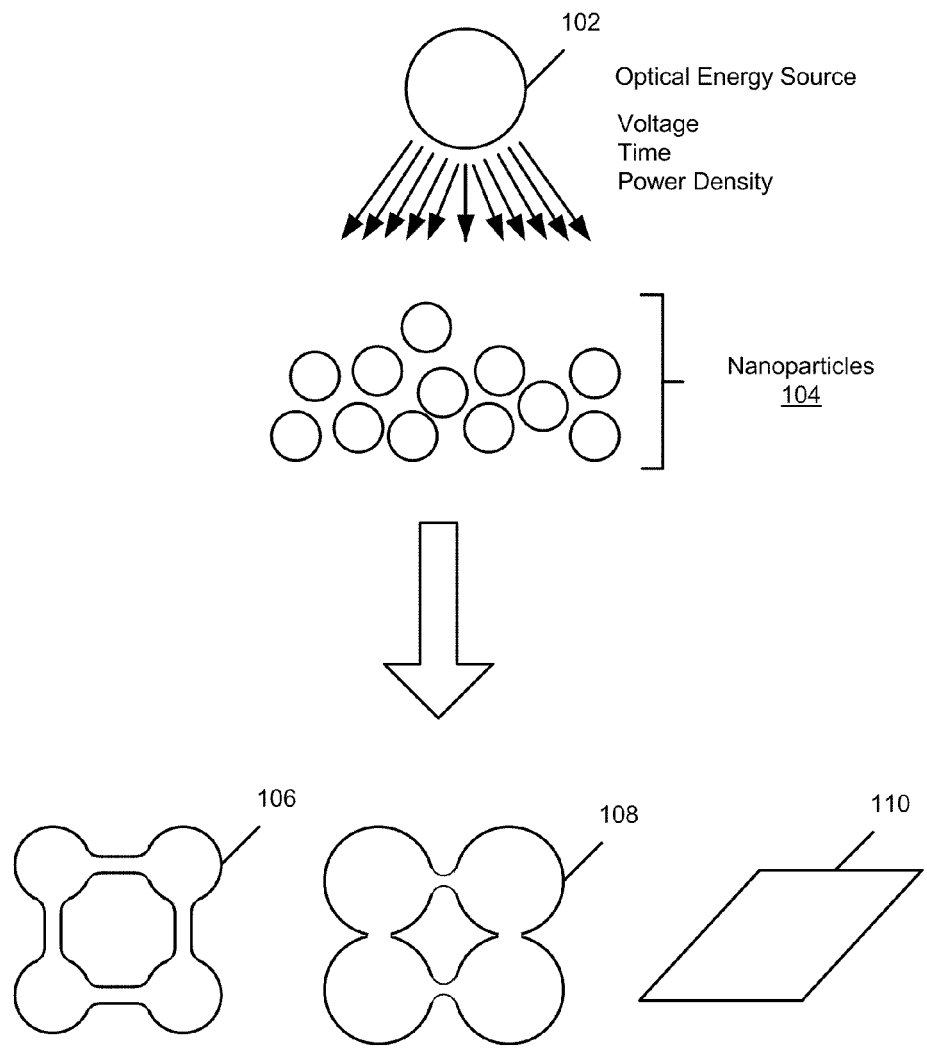
FIG. 1 shows a process of applying optical energy to nanoparticles to produce a nanostructure having predetermined and specified characteristics and properties.

FIG. 1 shows applying optical energy to nanoparticles to produce a nanostructure having specified properties and characteristics. In particular, FIG. 1 shows an optical energy source 102 to apply optical energy to nanoparticles 104. The optical energy source 102 may be a high intensity, broad spectrum lamp having an optical power on the order of about $10^6$ W and may be applied for a duration between 100 microseconds to 1 millisecond.

As optical energy is applied to the nanoparticles 104, the nanoparticles 104 may optically fuse to form a nanostructure 106-110. The predetermined processing conditions of the optical energy source 102 may control the characteristics and properties of the nanostructures 106-110 based on the amount of optical energy applied to the nanoparticles 104. For example, the voltage, time, power density, or combinations thereof, may be varied to produce the nanostructures 106, 108, or 110.

In particular, the extent or degree to which the nanoparticles 104 are optically fused together may depend on the voltage, time (i.e. duration), and power density of the optical energy source 102 applied to the nanoparticles 104. Thus, predetermined and specified ranges of the voltage, time, and power density of the optical energy source 104 may produce the various nanostructures 106-110. In some cases, the predetermined voltage, time, and power density of the optical energy source 104 applied to produce a specified nanostructure also takes into account the chemical identify and composition of the nanoparticles 104. To illustrate, a respective set of conditions of the optical energy source 102 is applied to Cu nanoparticles to produce one of the nanostructures 106-110. In addition, a respective set of conditions of the optical energy source 102 is applied to Si nanoparticles to produce one of the nanostructures 106-110.

The nanostructures 106-110 may be characterized by the extent that the nanoparticles 104 are fused together when optical energy is applied to the nanoparticles 104. In other words, the degree of optical fusion is quantified to characterize the nanostructures. For example, predetermined voltage, time, (i.e. duration) and/or power density settings of the optical energy source 102 may produce a nanostructure with nanoparticles fused to a first extent or degree, such as the nanostructure 106.

In another implementation, different voltage, duration, and/or power density settings of the optical energy source 104 may yield a nanostructure with nanoparticles fused to a second extent or degree, such as the nanostructure 108. In a further implementation, other voltage, duration, and/or power density settings of the optical energy source 106 may produce a continuous film of fused nanoparticles, such as the nanostructure 110.

The degree or extent to which the nanoparticles 104 are fused together may be expressed in terms of the porosity. In particular, the degree of optical fusion is characterized in terms of pore size within the nanostructures 106-110, the number of pores of the nanostructures 106-110 (i.e. the pore density), or both depending upon the predetermined processing conditions utilized to apply optical energy to the nanoparticles 104. The extent to which the nanoparticles 104 are fused together may additionally, or alternatively, be expressed as the particle size of the optically fused nanoparticles.

In particular, the porosity of the nanostructures 106-110 progressively decreases from the nanostructure 106 to the nanostructure 110. Thus, the pore density of the nanostructure 106 is greater than the pore density of the nanostructure 108. The pore density of the nanostructure 108 is greater than the pore density of the nanostructure 110. Additionally, the pore size of the optically fused nanoparticles increases from the nanostructure 106 to the nanostructure 110. Thus, the pore size of the optically fused nanoparticles of the nanostructure 106 is less than the optically fused nanoparticles of the nanostructure 108 and the pore size of the optically fused nanoparticles of the nanostructure 108 is less than the pore size of the optically fused nanoparticles of the nanostructure 110.

By varying the predetermined process conditions by which optical energy is applied to the nanoparticles 104, the characteristics of the nanostructures 106-110 may be engineered for specific applications. For example, some applications may call for nanostructures having a particular predetermined pore size and/or pore density of fused nanoparticles of a particular composition. Thus, the settings of the optical energy source 104 may be controlled in a predetermined manner in order to generate a nanostructure having suitable characteristics for the intended application.

Figure 2:
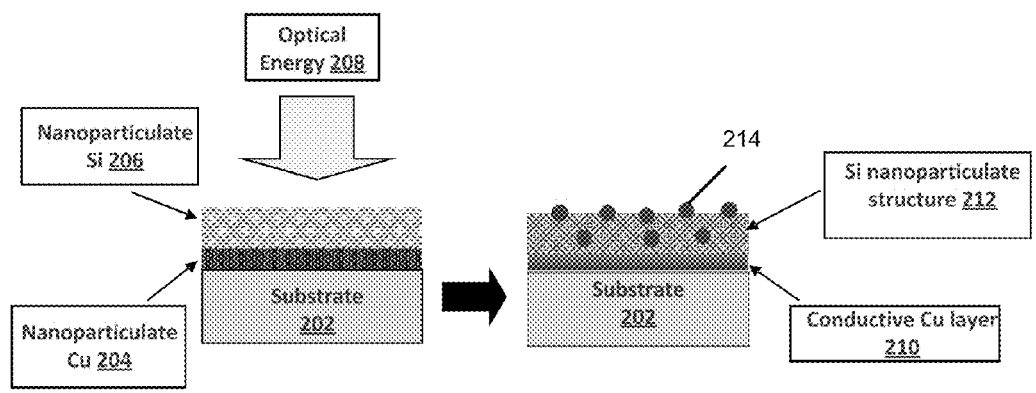
FIG. 2 shows applying optical energy to one or more layers of nanoparticulate Cu and one or more layers of nanoparticulate Si to produce a nanostructure including a fused Si nanoparticulate structure on a Cu conductive layer and having predetermined properties and characteristics.

FIG. 2 shows an exemplary process of applying optical energy to unfused nanoparticles to produce a specified nanostructure. In particular, FIG. 2 shows a substrate 202. The substrate 202 may by a polymeric material. In some cases, the polymeric material may be a polyamide, such as KAPTON®. The substrate 202 may also be formulated to include metal components dispersed or otherwise contained therein.

One or more unfused nanoparticulate layers may be applied to the substrate 202, such as a layer of unfused nanoparticulate Cu 204 and one or more layers of unfused nanoparticulate Si 206. The one or more layers of nanoparticles may be applied to the substrate 202 via a printing process. For example, the one or more layers of nanoparticulate Cu 204 may be applied to the substrate 202 by a conventional drawdown printing method. In addition, one or more layers of nanoparticulate Si 206 may be applied to the one or more layers of nanoparticulate Cu 204 via a conventional drawdown printing process. The printing process utilized to apply the one or more nanoparticulate layers 204, 206 to the substrate 202 may also include a known conventional screen printing process. The one or more nanoparticulate layers 202, 204 may also be applied to the substrate 202 via a known ink deposition process. Additionally, the one or more nanoparticulate layers 204, 206 may be applied to the substrate 202 in a pattern, such as a grid pattern, or as a continuous layer.

The one of more unfused layers of nanoparticulate Cu 204 and/or the one or more unfused layers of nanoparticulate Si 206 may be ink formulations including nanoparticulate Cu and/or nanoparticulate Si. The ink formulations of nanoparticulate Cu and nanoparticulate Si may be prepared according to techniques described in U.S. Pat. Nos. 7,514,369; 7,531,155; and 7,244,513; which are incorporated by reference herein in their entirety. In a particular implementation, the ink formulation of nanoparticulate Si may be derived from Si nanoparticles as received from a vendor, crystalline silicon powder that has been mechanically milled to nano-size particles, wet acid etched silicon nanoparticles, or combinations thereof. A size of the Si nanoparticles may be less than 100 nm Additionally, the Si nanoparticles may include p-type Si nanoparticles, n-type Si nanoparticles, or mixtures thereof.

In an illustrative example, to prepare an ink formulation including nanoparticulate Si, micron sized Si powders or fragments are ball milled followed by chemical etching followed by a size separation of the Si nanoparticles. The Si nanoparticles are then transferred to an inert atmosphere glove box, such as a VACCUM ATMOSPHERERS NEXUS® glove box, and formulated with a low boiling point solvent, such as benzyl alcohol and a dispersant. $Si_3N_4$ beads may also be added for further sonication. The mixture is then transferred to a glass bottle, sealed, and maintained in an inert $N_2$ atmosphere. The resultant nanoparticle slurry is sonicated in an ultrasonication bath for at least about 30 minutes and then ball milled using a rotary tumbler machine. The $Si_3N_4$ beads are removed via centrifugation and particles remaining in suspension may be decanted to obtain the ink formulation including nanoparticulate Si. The volume of the ink formulation containing nanoparticulate Si may be adjusted using a functional solvent to obtain the targeted Si loading.

After each application of a respective nanoparticulate layer to the substrate 202, the layer may be baked. For example, after one or more of the layers of nanoparticulate Si 206 is applied to the substrate 202, the layer of nanoparticulate Si 206 may be baked at a temperature of about 100° C. for a duration of about 10 minutes.

Optical energy 208 is applied to the one or more layers of nanoparticles, such as the layers 204 and 206, and the substrate 202. The optical energy 208 may be derived from a high intensity, broad spectrum source, such as a Xe lamp. The optical energy 208 may be applied for a predetermined duration and with a predetermined voltage, and/or predetermined power density depending on a desired amount or degree of fusion, pore size, and/or pore density of each of the one or more layers 204, 206. In a particular example, the power density of the optical energy source is in the range of 5.50 kW/cm² to 6.50 kW/cm². In this example, the optical energy 208 may be applied at a voltage in the range of 1075 V to 1175V and the optical energy 208 may be applied for about 800 microseconds. The optical energy 208 may also be applied in air and/or at about 25° C.

The optical energy 208 absorbed by the nanoparticles of the layers 204, 206 is converted into thermal energy and increases the temperature of the nanoparticles. Since nanoparticles tend to melt at lower temperatures than their corresponding bulk material, the nanoparticles of the layers 204, 206 may be fused together to a certain extent. Some of the thermal energy from the nanoparticles dissipates into the substrate 202 and ambient air. Since the optical energy is applied for a relatively quick duration, the temperature of the substrate 202 is less than 100° C., which advantageously prevents or minimizes thermal damage to the substrate 202.

After applying the optical energy 208, a conductive optically fused Cu layer 210 may be formed. Additionally, an optically fused Si nanoparticulate structure 212 may also be formed. The properties and characteristics of the conductive Cu layer 210 and/or the Si nanoparticulate structure 212 may be controlled or otherwise predetermined by the settings of an optical energy source utilized to apply the optical energy 208.

In some cases, the Si nanoparticles of the layer of nanoparticulate Si 206 may be optically fused together to form optically fused nanoparticulate Si balls 214 (i.e. aggregates). The size and/or density of the optically fused nanoparticulate Si balls 214 are controlled or otherwise predetermined by the conditions that the optical energy 208 is applied to the unfused layer of Si nanoparticles 204. In addition to optically fusing nanoparticles of the one or more layers 204, 206, the one or more of the layers of nanoparticles 204, 206 may also be cured. Upon curing, the one or more layers of nanoparticulate Cu 204 may have a conductivity greater than about $10^5$ S/cm.

Other layers of elemental nanoparticles may be applied to the substrate 202, such as Li, B, Zn, Ag, Al, Ni, Pd, Sn, Ga, or the like. Additionally, nanoparticulate alloys may be disposed on the substrate 202, such as Cu—Zn, Al—Zn, Li—Pd, Al—Mg, Mg—Al—Zn, or the like. Further, nanoparticulate compounds may be disposed on the substrate 202, such as ITO, $SnO_2$, NaCl, MgO, $Si_3N_4$, GaN, ZnO, ZnS, or the like.

In an illustrative implementation, the nanoparticulate structure 212, the conductive Cu layer 210, and the substrate 202 may be utilized to construct an anode for a battery, such as a Li ion battery anode. In particular, Si can be a candidate for use as an anode for a Li ion battery with a theoretical discharge capacity of about 4200 mAh/g. However, the capacity of many Si anodes fades during cycling. For example, Si may form an intermetallic alloy with Li according to the equation:

$$44Li + 10Si = 10Li_{4.4}Si \qquad (Eq. 1)$$

Since the atomic radius of Li is higher than that of Si (about 2.05 Angstroms for Li vs. about 1.46 Angstroms for Si), a volume expansion of the Si lattice may take place. Such volume expansion of the Si lattice may cause internal stress of the Si lattice leading to internal pulverization and cracks of the Si particles. As a result, Li ion diffusion pathways collapse trapping the Li ions. The collapse of Li diffusion pathways causes a loss of current and leads to capacity fade as cycling of a Li ion battery proceeds or otherwise increases.

In some instances, amorphous silicon, silicon composites, silicon alloys and nanosized silicon have been engineered in an attempt to improve cycle performance for Si anodes of Li ion batteries. However, in some cases, such as with respect to nanosize Si powders, the Si may aggregate during cycling which limits the Li conduction pathways. In other cases, such as amorphous Si and Si alloys, performance of the Si anodes formed from these materials may be improved. Further, in the case of Si nanowires on stainless steel substrates with a gold seed catalyst, the cost of the catalyst and the complicated nature of the process may be limiting.

Accordingly, fusing together nanoparticulate Si by applying optical energy to one or more layers of nanoparticulate Si to form the optically fused nanoparticulate structure 212 advantageously increases the mechanical strength of the nanoparticulate structure 212 and Li conduction pathways are maintained or otherwise improved. Additionally, the simplicity and cost effectiveness of the instant optical fusing process provide a superior alternative to existing Si battery anode manufacturing processes.

Figure 3A:
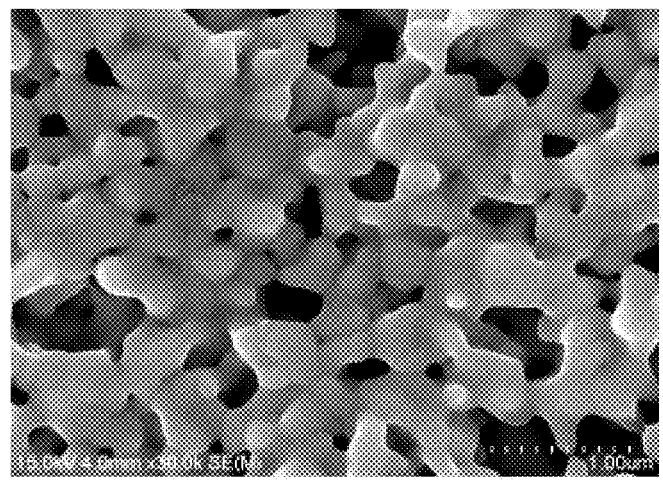
FIG. 3A is a Scanning Electron Microscope (SEM) image of nanoparticulate Cu fused to a first extent.

FIG. 3A is a Scanning Electron Microscope (SEM) image of nanoparticulate Cu fused to a first extent. The SEM image may be obtained using a JEOL 35CF Scanning Electron Microscope or a JEOL 6330F Field Emission Scanning Electron Microscope.

Figure 3B:
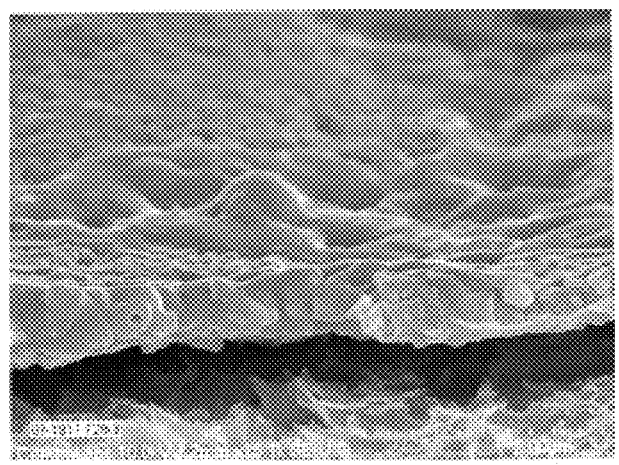
FIG. 3B is an SEM image of nanoparticulate Cu fused to a second extent.

FIG. 3B is an SEM image of nanoparticulate Cu fused to a second extent.

Figure 4A:
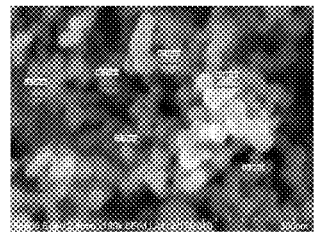
FIGS. 4A-4C are respective examples of nanoparticulate Si prior to applying optical energy.

FIG. 4A is an SEM image of nanoparticulate Si as received from a vendor, such as Sigma Aldrich, having an average size of about 30 nm in diameter, a loading concentration of about 9% by weight, and a viscosity of about 5 cp at 10 rpm.

Figure 4B:
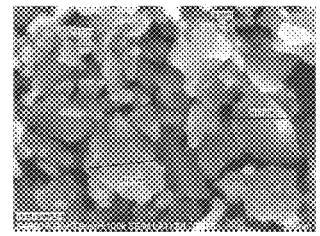

FIG. 4B is an SEM image of milled nanoparticulate Si having an average size of about 100 nm in diameter, a loading concentration of about 2% by weight, and a viscosity of about 3 cp at 10 rpm.

Figure 4C:
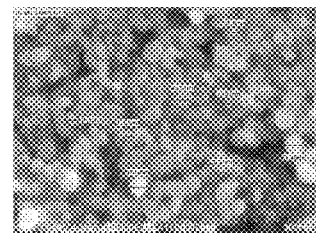

FIG. 4C is an SEM image of wet etched nanoparticulate Si having an average size of about 15 nm, a loading concentration of about 8% by weight, and a viscosity of about 5 cp at 10 rpm.

The nanoparticulate Si of FIGS. 4A-4C may comprise the nanoparticles 104 of FIG. 1 and/or may be applied to a substrate, such as the substrate 202 of FIG. 2.

Figure 5A:
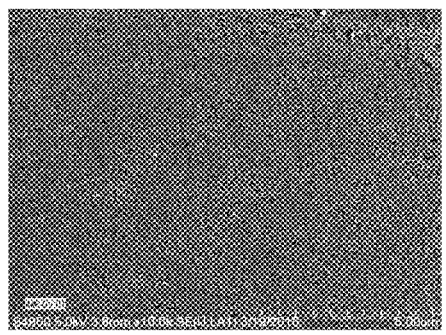
FIG. 5A is a low magnification SEM image of nanoparticulate Si printed on a layer of nanoparticulate Cu.
Figure 5B:
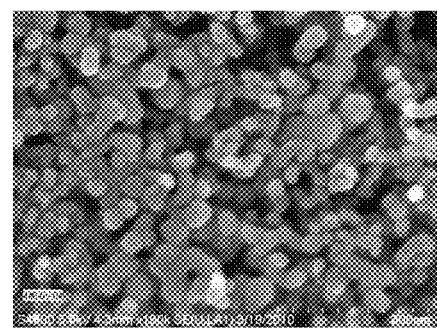
FIG. 5B is a high magnification SEM image of nanoparticulate Si printed on a layer of nanoparticulate Cu.

FIG. 5A is a low magnification SEM image of nanoparticulate Si printed on a layer of nanoparticulate Cu. FIG. 5B is a high magnification SEM image of nanoparticulate Si printed on a layer of nanoparticulate Cu. The nanoparticulate Si of FIGS. 5A and 5B may be produced using Si bulk or powder raw materials. The Si bulk or powder materials may be ball milled, chemically etched, and size separated to obtain the nanoparticulate Si of FIGS. 5A and 5B. The nanoparticulate Si of FIGS. 5A and 5B may comprise the nanoparticles 104 of FIG. 1 and/or may be applied to a substrate, such as the substrate 202 of FIG. 2.

Figure 6A:
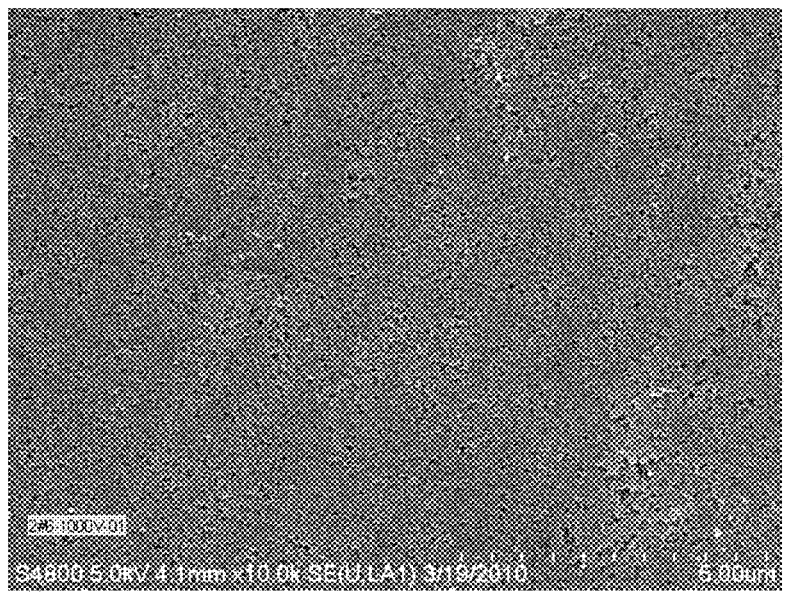
FIG. 6A is a low magnification SEM image of optically fused nanoparticulate Si disposed on a layer of optically fused nanoparticulate Cu and a substrate that have been exposed to a predetermined level and duration of optical energy under a first set of predetermined conditions.
Figure 6B:
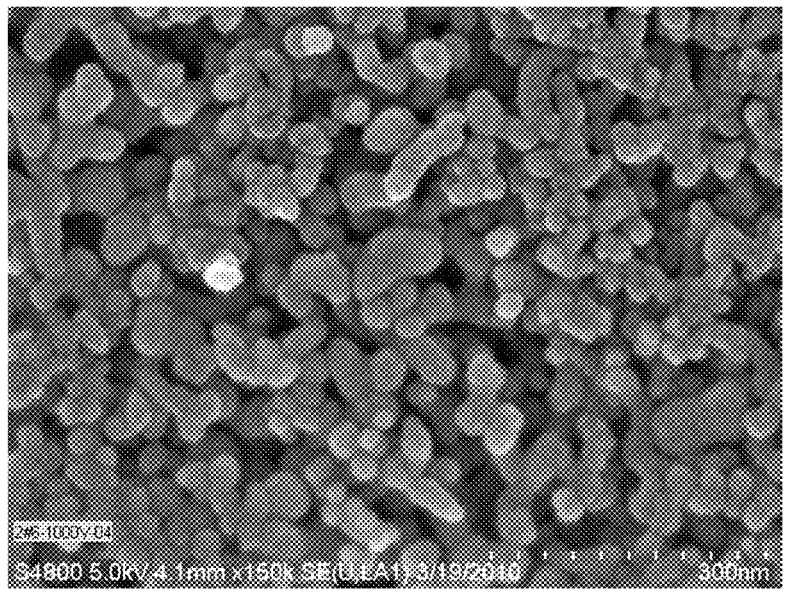
FIG. 6B is a high magnification SEM image of optically fused nanoparticulate Si disposed on a layer of optically fused nanoparticulate Cu and a substrate that have been exposed to a predetermined level and duration of optical energy under the first set of predetermined conditions.

FIG. 6A is a low magnification SEM image of optically fused nanoparticulate Si disposed on a layer of optically fused nanoparticulate Cu and a substrate that have been exposed to optical energy having a power density of about 4.69 kW/cm$^2$ for a duration of about 800 microseconds at a voltage of about 1000 V. FIG. 6B is a high magnification SEM image of optically fused nanoparticulate Si disposed on a layer of optically fused nanoparticulate Cu and a substrate that have been exposed to optical energy having a power density of about 4.69 kW/cm$^2$ for a duration of about 800 microseconds at a voltage of about 1000 V. FIGS. 6A and 6B indicate the lack of fused nanoparticulate Si.

Figure 7A:
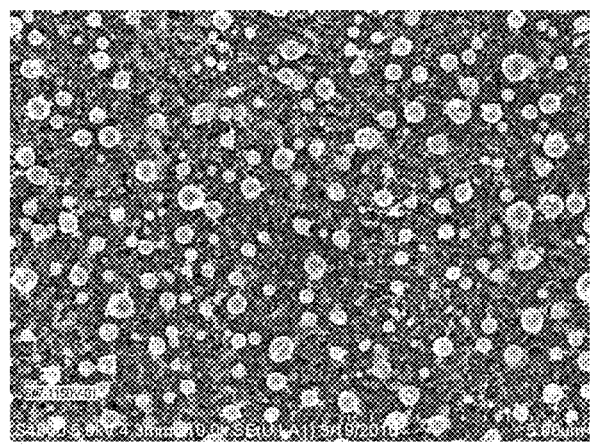
FIG. 7A is a low magnification SEM image of optically fused nanoparticulate Si disposed on a layer of optically fused nanoparticulate Cu and a substrate that have been exposed to a predetermined level and duration of optical energy under a second set of predetermined conditions.
Figure 7B:
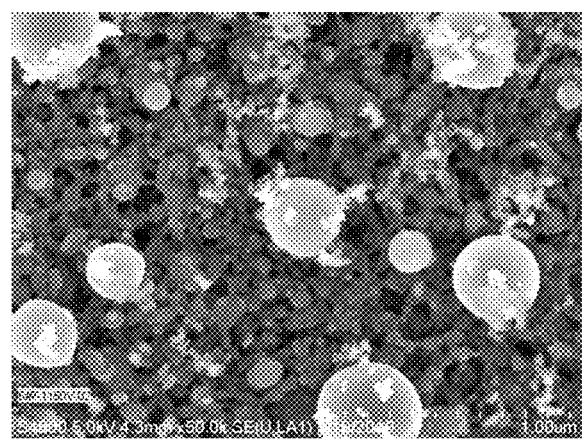
FIG. 7B is a high magnification SEM image of optically fused nanoparticulate Si disposed on a layer of optically fused nanoparticulate Cu and a substrate that have been exposed to a predetermined level and duration of optical energy under the second set of predetermined conditions.

FIG. 7A is a low magnification SEM image of optically fused nanoparticulate Si disposed on a layer of optically fused nanoparticulate Cu and a substrate that have been exposed to optical energy having a power density of about 6.20 kW/cm$^2$ for a duration of about 800 microseconds at a voltage of about 1150 V. FIG. 7B is a high magnification SEM image of optically fused nanoparticulate Si disposed on a layer of optically fused nanoparticulate Cu and a substrate that have been exposed to optical energy having a power density of about 6.20 kW/cm$^2$ for a duration of about 800 microseconds at a voltage of about 1150 V. FIGS. 7A and 7B indicate the formation of fused nanoparticulate Si.

Figure 8A:
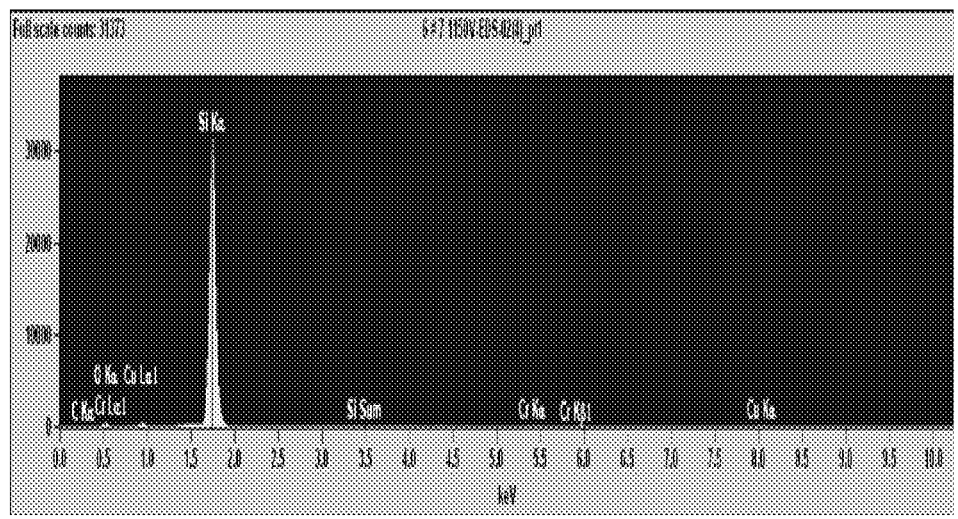
FIG. 8A is a graph showing an energy dispersive x-ray spectroscopy (EDS) image of unfused nanoparticulate Si prior to applying a predetermined level and duration of optical energy.
Figure 8B:
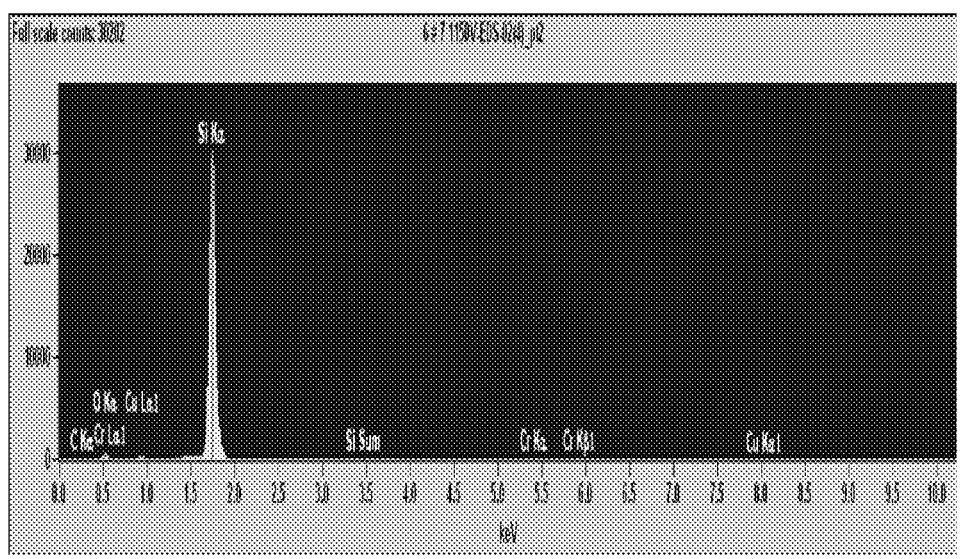
FIG. 8B is a graph showing an EDS image of the nanoparticulate Si of FIG. 8A after being exposed to the predetermined level and duration of optical energy, wherein the nanoparticulate Si is optically fused.

FIG. 8A is a graph showing an energy dispersive x-ray spectroscopy (EDS) image of nanoparticulate Si prior to applying a predetermined level and duration of optical energy. FIG. 8B is a graph showing an EDS image of the nanoparticulate Si of FIG. 8A after being exposed to optical energy having a power density of about 6.20 kW/cm$^2$ for a duration of about 800 microseconds at a voltage of about 1150 V. The peaks of the EDS spectra of FIGS. 8A and 8B indicate the presence of Si with an undetectable amount of $O_2$ after application of the optical energy.

Figure 9:
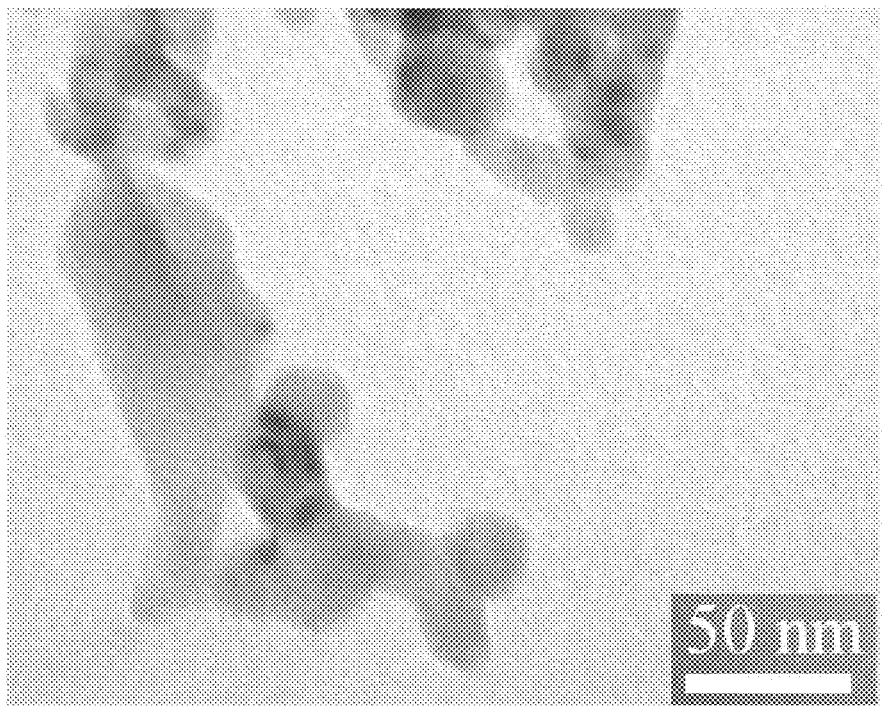
FIG. 9 is a TEM image of optically fused nanoparticulate Si disposed on a layer of optically fused nanoparticulate Cu and a substrate that have been exposed to a predetermined level and duration of optical energy.

FIG. 9 is a TEM image of optically fused nanoparticulate Si disposed on a layer of optically fused nanoparticulate Cu and a substrate that have been exposed to optical energy having a power density of about 5.67 kW/cm$^2$ for a duration of about 800 microseconds at a voltage of about 1100 V. The TEM image may be obtained with a Philips CM-200 TEM.

Figure 10:
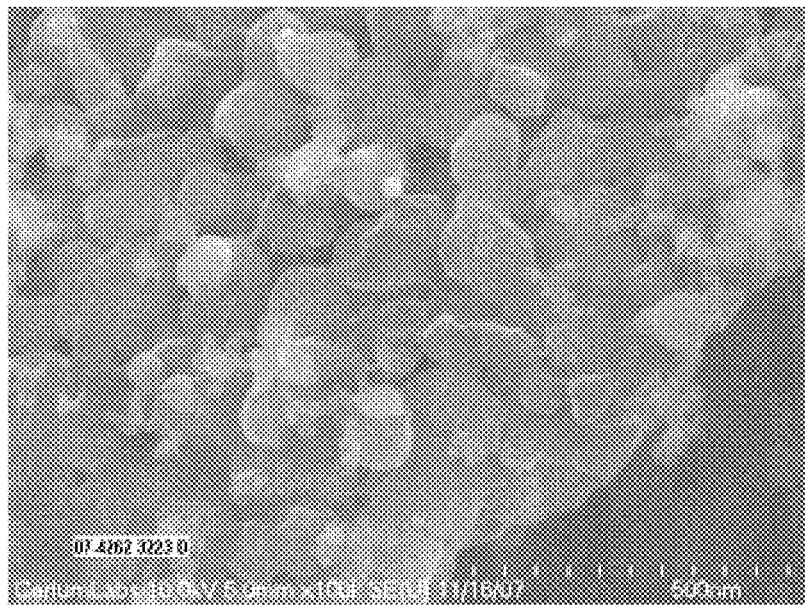
FIG. 10 is an additional SEM image of optically fused nanoparticulate Si disposed on a layer of optically fused nanoparticulate Cu and a KAPTON® substrate that have been exposed to a predetermined level and duration of optical energy.

FIG. 10 is an additional image of optically fused nanoparticulate Si applied to a layer of optically fused nanoparticulate Cu and a KAPTON® substrate that has been exposed to a predetermined level and duration of optical energy.

Figure 11:
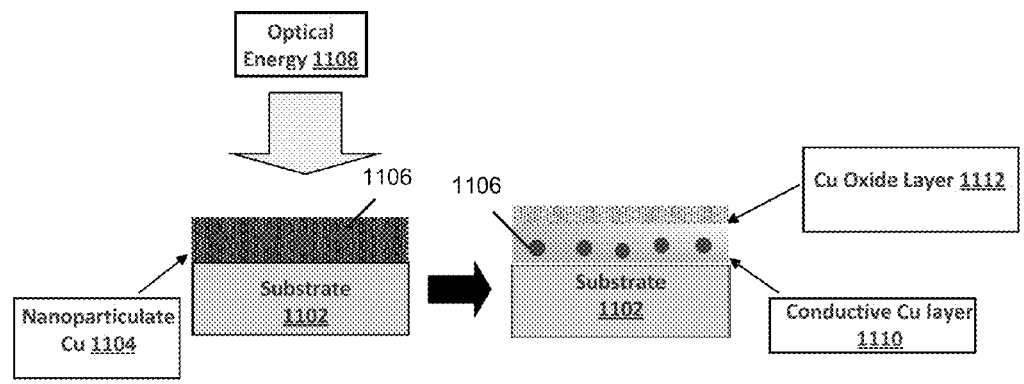
FIG. 11 shows a process of applying optical energy to a layer of nanoparticulate Cu including nanoparticulate MnO additives disposed therein and oxidizing the layer of optically fused nanoparticulate Cu including the MnO additives disposed therein to produce a specified nanostructure having predetermined properties and characteristics.

FIG. 11 shows a process of applying optical energy to a layer of nanoparticulate Cu including nanoparticulate MnO additives disposed therein and oxidizing a layer of optically fused nanoparticulate Cu including the MnO additives to produce a specified nanostructure having predetermined properties and characteristics. In particular, FIG. 11 shows a substrate 1102. The substrate 1102 may by a polymeric material. In some cases, the polymeric material may be a polyamide, such as KAPTON®. The substrate 1102 may also be formulated to include metal components dispersed or otherwise contained therein.

One or more unfused nanoparticulate layers may be applied to the substrate 1102, such as one or more layers of unfused nanoparticulate Cu 1104. The one or more layers of unfused nanoparticles may be applied to the substrate 1102 via a printing process. For example, the one or more layers of unfused nanoparticulate Cu 1104 may be applied to the substrate 1102 by a known and conventional drawdown printing method. In addition, the printing process utilized to apply the one or more layers to the substrate 1102 may also include a known conventional screen printing process. The one or more layers of unfused nanoparticles may also be applied to the substrate 1102 via a known ink deposition process.

The layer of unfused nanoparticulate Cu 1104 may be an ink formulation including nanoparticulate Cu. The ink formulation may also include additives disposed therein, such as nanoparticulate MnO additives 1106. An ink formulation including nanoparticulate Cu and nanoparticulate MnO additives may be prepared according to techniques described in U.S. Pat. Nos. 7,514,369; 7,531,155; and 7,244,513; which are incorporated by reference herein in their entirety. In a particular example, nanoparticulate Cu and nanoparticulate MnO may be combined in a MicroCer Ball-Mill from NETZSCH® at an agitation speed between 2000-2500 rpm and ground via sonication for a duration of about 30 minutes. The ink formulation containing nanoparticulate Cu and nanoparticulate MnO additives may have a viscosity between 5 cp to 15 cp, a surface tension between 20 mN/m and 30 mN/m, and an average particle size less than about 100 nm. In addition, the loading of the nanoparticulate MnO additives may be between 10% to 40% by weight.

Optical energy 1108 is applied to the one or more layers of unfused nanoparticles, such as the layer 1104, and the substrate 1102. The optical energy 1108 may be derived from a high intensity, broad spectrum lamp. In particular, the optical energy source may be a Xe lamp. The optical energy 1108 may be applied for a predetermined duration and at a predetermined voltage, and/or predetermined power density to achieve a predetermined amount or degree of fusion, pore size, and/or pore density of each of the one or more layers 1104. The total energy density applied to the one or more layers of nanoparticulate Cu 1104 and the substrate 1102 may be up to about 12 J/cm$^2$ at a duration between 0.2 milliseconds to 1.0 milliseconds.

After applying the optical energy 1108, an optically fused conductive Cu layer 1110 may be formed. The properties and characteristics of the optically fused conductive Cu layer 1110 may be controlled or otherwise predetermined by the settings of an optical energy source utilized to apply the optical energy 1108. The optically fused conductive Cu layer 1110 may have a resistance less than 1 Ω/cm$^2$.

Further, a Cu oxidation layer 1112 may be formed on the optically fused conductive Cu layer 1110. For example, the optically fused conductive Cu layer 1110 may be heated in air or in an $O_2$ environment at a temperature between 200° C. and 300° C. for a duration of between 3 minutes and 5 minutes.

In an illustrative implementation, a nanostructure including the substrate 1102, the optically fused conductive Cu layer 1110, and the Cu oxidation layer 1112 may be utilized as an electrode of a supercapacitor. In particular, copper oxide electrodes may store energy via the equation:

$$Cu^{2+} + e^- \leftrightarrow Cu^- (-0.08 \text{ V/SCE}) \qquad (Eq. 2)$$

Supercapacitors may be applied in wireless components and mobile devices, such as PCMCIA cards, compact flash memory, mobile handsets, smart phones, personal digital assistants (PDAs), digital cameras, netbooks, digital media players, toys, eBook readers, and so on. The advantages of supercapacitors can include a fast charging/discharging rate, long cycle life, high cycle efficiency, and broad operating temperature range. However, supercapacitors may have a low specific energy density.

In particular, the nanostructure including the substrate 1102, the optically fused conductive Cu layer 1110, and the Cu oxidation layer 1112 may be utilized to construct a pseudocapacitor. Pseudocapacitors exhibit characteristics of both electrochemical double layer capacitors and batteries, such as electron transfer reactions and bulk and interfacial processes. Pseudocapacitors store energy on the surface and/or subsurface. Thus, pseudocapacitors having a larger surface area may have greater energy densities. Due to the porous nature of the nanostructure of FIG. 11, the nanostructure may have a relatively high surface area with an energy density greater than 20 Wh/kg and a specific power density greater than 1 kW/kg.

Figure 12:
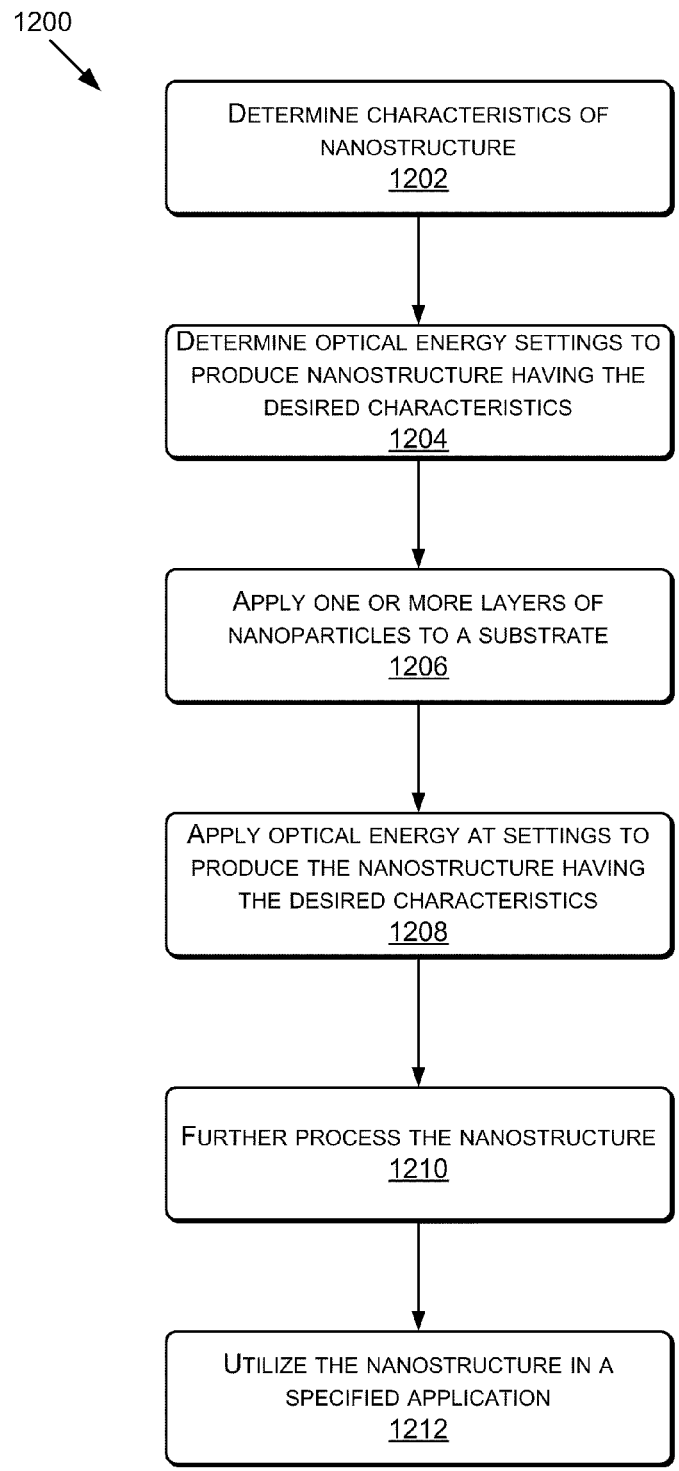
FIG. 12 is a flow diagram illustrating a process for making a specified nanostructure having predetermined properties and characteristics.

FIG. 12 is a flow diagram of a process 1200 to produce a nanostructure comprised of optically fused nanoparticles having predetermined properties and characteristics. At 1202, desired characteristics and properties of a nanostructure are determined. For example, the characteristics and properties of the nanostructure may depend on an application of the nanoparticulate structure. In particular, some applications may utilize nanostructures having a first pore density and pore size, while other applications utilize nanostructures having a second pore density and pore sizes. In some cases, the pore size specified may be an average pore size. Other qualities of the nanostructure may also be determined, such as a resistivity of one or more layers of the nanostructure, thermal conductivity of one or more layers of the nanostructure, and so on.

At 1204, settings of an optical energy source are predetermined to produce the nanostructure having the predetermined characteristics. For example, a voltage, a duration, and/or a power density related to the operation of an optical energy source may be predetermined such that when the optical energy source is applied to a nanoparticulate starting material, a nanostructure having the predetermined characteristics is produced.

At 1206, one or more layers of unfused nanoparticles are applied to a substrate. The composition of the layers of unfused nanoparticles may depend on the predetermined characteristics and properties of the resultant nanostructure. For example, the composition of the one or more layers of unfused nanoparticles may depend on a predetermined amount of resistivity of the nanostructure. In another example, the composition of the one or more layers of unfused nanoparticles applied to the substrate may depend on a predetermined mechanical stability of the nanostructure. In a further example, the one or more layers of unfused nanoparticles applied to the substrate may depend on a predetermined thermal conductivity of the nanostructure. In some cases, the composition of the one or more layers of nanoparticles may include elemental nanoparticles, such as nanoparticulate Cu or nanoparticulate Si, elemental nanoparticles containing nanoparticulate additives disposed therein, nanoparticulate compounds, nanoparticulate alloys, or combinations thereof.

At 1208, optical energy is applied to the one or more layers of unfused nanoparticles that have been applied to the substrate. The optical energy is applied at the predetermined duration, voltage, and/or power density settings in order to produce the nanostructure with the predetermined characteristics. At 1210, the nanostructure may be further processed. For example, one or more layers of the nanostructure may be thermally cured. In another example, an oxidation process may be applied to one or more layers of the nanostructure.

At 1212, the nanostructure is utilized in a specified application. To illustrate, the nanostructure may be utilized as an anode of a battery, such as a Li-ion battery anode. In other cases, the nanostructure may be utilized as a supercapacitor.

Although, the operations 1202-1212 are described as occurring in a particular order, the order in which the operations 1202-1212 are described is not intended to be construed as a limitation, and any number of the described operations can be combined in any order and/or in parallel to implement the process 1200.

EXAMPLES

Example 1

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 800V for about 800 microseconds with a power density of about 3.00 kW/cm². The layer of nanoparticulate Si was not cured and there was little to no fusing of nanoparticulate Si. Additionally, the layer of nanoparticulate Cu was not cured.

Example 2

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 1000V for about 800 microseconds with a power density of about 4.69 kW/cm². The layer of nanoparticulate Si was not cured and there was little to no fusing of nanoparticulate Si. Additionally, the layer of nanoparticulate Cu was cured and was conductive.

Example 3

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 110V for about 800 microseconds with a power density of about 5.67 kW/cm². The layer of nanoparticulate Si was cured and there was fusing of nanoparticulate Si. Additionally, the layer of nanoparticulate Cu was cured and was conductive.

Example 4

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 1150V for about 800 microseconds with a power density of about 6.20 kW/cm². The layer of nanoparticulate Si was cured and there was fusing of nanoparticulate Si. Additionally, the layer of nanoparticulate Cu was cured and was conductive.

Example 5

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 1200V for about 800 microseconds with a power density of about 6.75 kW/cm². The layer of nanoparticulate Si partially separated from the layer of nanoparticulate Cu. Additionally, the layer of nanoparticulate Cu was cured and was conductive.

Example 6

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 1600V for about 500 microseconds with a power density of about 19.20 kW/cm². The layer of nanoparticulate Si was separated from the layer of nanoparticulate Cu. Additionally, the layer of nanoparticulate Cu was partially separated from the substrate.

Example 7

Optical energy was applied to a KAPTON® substrate having a layer of nanoparticulate Cu and a layer of nanoparticulate Si. The layer of nanoparticulate Si was comprised of a Si ink formulation that was prepared from Si nanoparticles as purchased from a vendor having a viscosity of 5 cp at 10 rpm and a loading concentration of 9 weight %. The optical energy was applied at a voltage of about 2000V for about 200 microseconds with a power density of about 5.00 kW/cm². The layer of nanoparticulate Si was cured and there was some fusing of nanoparticulate Si, but the curing and fusing of nanoparticulate Si was not uniform. Additionally, the layer of nanoparticulate Cu was cured and was conductive.

Example 8

In an electrochemical characterization of a sample Si anode, the specific capacity of the end product of example 3 was measured using a Princeton Applied Research VMP3-CHAS 16 channel analyzer. The testing conditions were:

Half Cell
Working Electrode: Si based thin film
Reference Electrode Li
Counter Electrode Li
Electrolyte: FC-130
Separator: Polypropylene
Voltage Window 0.02 V-1.5 V
Current: 100 mA/g The specific capacity for the first cycle was 6000 mAh/g and the specific capacity of the second cycle was 1700 mAh/g.

The invention claimed is:

1. An article of manufacture made by a method comprising: applying optical energy to one or more layers of nanoparticulate material under specified conditions to produce a nanostructure having layers with a predetermined degree of porosity and a predetermined size of fused nanoparticles.

2. The method of claim 1, wherein the one or more layers of nanoparticulate material include at least one layer of nanoparticulate Cu.

3. The method of claim 2, wherein the at least one layer of nanoparticulate Cu is disposed on a polyamide substrate.

4. The method of claim 3, wherein the at least one layer of nanoparticulate Cu is disposed on the polyamine substrate by printing the at least one layer of nanoparticulate Cu on the polyamide substrate.

5. The method of claim 4, wherein the at least one layer of nanoparticulate Cu is printed on the polyamide substrate by a drop down printing process, a screen printing process, or a combination thereof.

6. The method of claim 1, wherein the one or more layers of nanoparticulate material include at least one layer of nanoparticulate Si.

7. The method of claim 6, wherein the at least one layer of nanoparticulate Si is disposed on at least one layer of nanoparticulate Cu.

8. The method of claim 7, wherein the at least one layer of nanoparticulate Si is disposed on the at least one layer of nanoparticulate Cu by a drop down printing process, a screen printing process, or a combination thereof.

9. The method of claim 1, wherein the specified conditions include a predetermined voltage, a predetermined duration, a predetermined power density, or combinations thereof.

10. The method of claim 9, wherein the optical energy is applied via an optical energy source having an optical power of $10^6$ W.

11. The method of claim 1, wherein the optical energy is applied for a duration of 0.2 to 1.0 milliseconds.

12. The method of claim 1, wherein the optical energy is applied with an energy density up to 12 J/cm².

13. A Si anode of a Li ion battery made by the method of claim 1.

14. The method of claim 1, wherein the one or more layers of nanoparticulate material include at least one layer of nanoparticulate Cu with nanoparticulate MnO additives.

15. The method of claim 14, further comprising forming a Cu oxide layer by applying heat to the at least one layer of nanoparticulate Cu with nanoparticulate MnO additives at a temperature between 200° C. to 300° C. for a duration between 3 minutes and 5 minutes.

16. A supercapacitor made by the method of claim 15.

17. A method comprising applying optical energy to a nanoparticulate material under specified conditions to produce a nanostructure with a predetermined degree of porosity and a predetermined size of fused nanoparticles.

18. The method of claim 17, wherein the nanoparticulate material includes nanoparticulate copper.

19. The method of claim 18, further comprising disposing the nanoparticulate copper onto a polyamide substrate.

20. The method of claim 17, wherein the nanoparticulate material includes nanoparticulate silicon.

21. The method of claim 20, further comprising disposing the nanoparticulate silicon onto a polyamide substrate.

22. The method of claim 17, wherein the specified conditions include a predetermined voltage, a predetermined duration, a predetermined power density, or combinations thereof.

23. The method of claim 17, wherein the optical energy is applied via an optical energy source having an optical power of $10^6$ W.

24. The method of claim 23, wherein the optical energy is applied for a duration of 0.2 to 1.0 milliseconds.

25. The method of claim 17, wherein the optical energy is applied with an energy density up to 12 J/cm$^2$.

26. The method of claim 17, wherein the nanoparticulate material includes a layer of nanoparticulate copper with nanoparticulate MnO additives.

27. The method of claim 26, further comprising forming a copper oxide layer by applying heat to the nanoparticulate copper with nanoparticulate MnO additives at a temperature between 200° C. to 300° C. for a duration between 3 minutes and 5 minutes.

* * * * *